(12) United States Patent
Soppera et al.

(10) Patent No.: US 9,124,565 B2
(45) Date of Patent: Sep. 1, 2015

(54) RADIO FREQUENCY IDENTIFICATION DEVICES AND READER SYSTEMS

(75) Inventors: Andrea Soppera, Ipswich (GB); Trevor Burbridge, Ipswich (GB); Chritian Tutsch, Graz (AT)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1034 days.

(21) Appl. No.: 12/810,933

(22) PCT Filed: Dec. 23, 2008

(86) PCT No.: PCT/GB2008/004256
§ 371 (c)(1),
(2), (4) Date: Jun. 28, 2010

(87) PCT Pub. No.: WO2009/083708
PCT Pub. Date: Jul. 9, 2009

(65) Prior Publication Data
US 2010/0283614 A1    Nov. 11, 2010

(30) Foreign Application Priority Data

Dec. 28, 2007 (EP) .................................... 07255075
Dec. 28, 2007 (EP) .................................... 07255076

(51) Int. Cl.
*G08B 13/14* (2006.01)
*H04L 29/06* (2006.01)
(Continued)

(52) U.S. Cl.
CPC ............ *H04L 63/062* (2013.01); *G06F 21/445* (2013.01); *H04L 63/0853* (2013.01); *H04W 12/06* (2013.01); *H04L 63/0428* (2013.01); *H04W 4/008* (2013.01)

(58) Field of Classification Search
USPC ........................ 340/574.4, 10.1–10.5, 5.1–5.6
See application file for complete search history.

(56) References Cited

U.S. PATENT DOCUMENTS 5,841,865 A    11/1998  Sudia
6,185,307 B1    2/2001  Johnson, Jr.
(Continued)

FOREIGN PATENT DOCUMENTS

EP    1 783 950 A1    5/2007
GB    2 422 514    7/2006
WO    2006/075146    7/2006

OTHER PUBLICATIONS

International Search Report (5 pgs.); dated Mar. 26, 2009 issued in International Application No. PCT/GB2008/004256.
(Continued)

*Primary Examiner* — Ojiako Nwugo
(74) *Attorney, Agent, or Firm* — Nixon & Vanderhye PC

(57) ABSTRACT

An RFID device such as an RFID tag (2) and method comprising: storing a current read key and a current ownership key; receiving, from the RFID reader system (4), a change read key command and an indication that the RFID reader system (4) holds the current ownership key; and in response, replacing the current read key with a new current read key enabling the RFID device (2) to be read by an RFID reader system (4) holding the new current read key. Also, an RFID reader system (4) and method for an RFID reader system (4) to process an RFID device (2), comprising: issuing a take ownership command to an RFID device (2); receiving a new ownership key from the RFID device (2); applying for authorization of the new ownership key; and receiving from the authorization apparatus (6) the new ownership key and an acknowledgement that may be communicated to the tag as evidence of authorization.

31 Claims, 9 Drawing Sheets

(51) Int. Cl.
  *G06F 21/44* (2013.01)
  *H04W 12/06* (2009.01)
  *H04W 4/00* (2009.01)

(56) References Cited

U.S. PATENT DOCUMENTS

| | | | | |
|---|---|---|---|---|
| 2001/0050990 | A1* | 12/2001 | Sudia | 380/286 |
| 2005/0058292 | A1* | 3/2005 | Diorio et al. | 380/270 |
| 2005/0066175 | A1* | 3/2005 | Perlman | 713/176 |
| 2007/0109124 | A1* | 5/2007 | Park et al. | 340/572.1 |
| 2008/0301463 | A1* | 12/2008 | Michelsen | 713/185 |

OTHER PUBLICATIONS

Extended European Search Report (7 pgs.) dated Jun. 10, 2008 issued in European priority Application No. 07255075.9.

Extended European Search Report (8 pgs.) dated Aug. 4, 2008 issued in European priority Application No. 07255076.7.

Finkenzeller K: "RFID-Handbuch: Kapitel 8 (Datensicherheit), 10.1 (Transponder mit Speicherfunktion)"; RFID Handbuch, Hansder Verlag, Muenchen, DE; Dec. 31, 1998; pp. 133-140, 155; XP002394433.

Sepideh Fouladgar, Hossam Afifi: "A Simple Privacy Protecting Scheme Enabling Delegation and Ownership Transfer for RFID Tags"; Journal of Communications (JCM) [Online]; vol. 2; No. 6; Nov. 30, 2007; pp. 6-13; XP009100969.

Juels A: "RFID Security and Privacy: A Research Survey"; Internet Citation [Online]; XP002375728; Retrieved from the internet on Apr. 3, 2006.

David Molnar et al.; "A Scalable, Delegatable Pseudonym Protocol Enabling Ownership Transfer of RFID Tags"; Jan. 1, 2006, Selected Areas in Cryptography Lecture Notes in Computer Science; LNCS, Springer-Verlag, BE; pp. 276-290; XP019029546.

Junichiro Saito et al.: "Reassignment Scheme of an RFID Tag's Key for Owner Transfer"; Embedded and Ubiquitous Computing Lecture Notes in Computer Science; LNCS, Springer, Berlin, DE; vol. 3823, Jan. 1, 2005; pp. 1303-1312; XP019025409.

Chae Hoon Lim et al.: "Strong and Robust RFID Authentication Enabling Perfect Ownership Transfer"; Information and Communications Security Lecture Notes in Computer Science; LNCS, Springer, Berlin, DE; vol. 4307; Jan. 1, 2006; pp. 1-20; XP019051565.

Hun-Wook Kim et al.: "Symmetric Encryption in RFID Authentication Protocol for Strong Location Privacy and Forward-Security"; Hybrid Information Technology; 2006; ICHIT 2006; International Conference IEEE; Piscataway, NJ, USA.

Kyosuke Osaka et al.: "An Efficient and Secure RFID Security Method with Ownership Transfer"; Computational Intelligence and Security, 2006; International Conference IEEE; PI; Nov. 1, 2006; pp. 1090-1095; XP031012972.

Molnar, David and Wagner, David; "Privacy and Security Library RFID Issues, Practices, and Architectures"; Conference on Computer and Communications Security; Proceedings on the $11_{th}$ ACM Conference on Computer and Communications Security, 2004; pp. 210-219; XP002516848.

* cited by examiner

RADIO FREQUENCY IDENTIFICATION DEVICES AND READER SYSTEMS

This application is the U.S. national phase of International Application No. PCT/GB2008/004256 filed 23 Dec. 2008 which designated the U.S. and claims priority to EP Patent Application Nos. 07255075.9 filed 28 Dec. 2007 and EP 07255076.7 filed 28 Dec. 2007, the entire contents of each of which are hereby incorporated by reference.

BACKGROUND AND SUMMARY

The present invention relates to radio frequency identification (RFID) devices such as RFID tags, processes therefor, and processing thereof. The present invention also relates to apparatus and protocols for implementing such processes and processing. The present invention relates in particular, but not exclusively, to RFID tags attached to or otherwise associated with items in a supply chain.

RFID tags are well known. RFID tags are circuits in the form of label-like items that can be read (and sometimes also written on) by reader (and writer) units communicating with the tags at RF frequencies. Further details of RFID tag technology can found in, for example, Landt, Jerry (2001), "Shrouds of Time: The history of RFID", AIM, Inc.

It is known to attach RFID tags, written with batch or unique codes, to items, and to monitor received items.

An example of a proposed standardised approach using RFID technology is known as EPCglobal, further details of which can be found at, for example, www.epcglobalinc.org or from GS1 US, Princeton Pike Corporate Center, 1009 Lenox Drive, Suite 202, New Jersey 08648 Lawrenceville. EPCglobal is incorporated herein by reference.

EPCglobal has proposed an architecture where each tag is given a 96-bit unique code and where each entity in the supply chain can publish information about the product through a so-called EPC information service. An EPC information service is a database that provides a standardized query interface. EPCglobal allows for an EPCglobal tag to respond to a so-called "kill" command. When a secure tag receives a kill command from the RFID reader the tag becomes inoperative. The killing command can be password protected.

An arrangement that allows for delegation of the ability to identify a tag is disclosed in the article "A Scalable, Delegatable Pseudonym Protocol—Enabling Ownership Transfer of RFID Tags", David Molnar, Andrea Soppera and David Wagner, Selected Areas in Cryptography, pages 276-290, Aug. 11-12, 2005, Queen's University, Kingston, Ontario, Canada. The described delegation-enabled scheme associates a tag to an ownership-domain by delegating a time-limited ability for identification.

A starting point for the arrangement described in the preceding paragraph is a tree-based scheme to identify tags based on encryption with shared secrets, which was described in the article "Privacy and Security in Library RFID—Issues, Practices, and Architectures", David Molnar and David Wagner, Proceedings of the 11th ACM Conference on Computer and Communications Security, Oct. 25-29, 2004, Washington D.C., USA.

The book Finkenzeller: "RFID-Handbuch", 1998 contains a chapter on "Data Security" (see Kapitel 8: "Datensicherheit") and a part of a chapter on "Transponders with a Memory Function" (see Kapitel 10.1: "Transponder mit Speicherfunktion"). This book includes discussions of the use of different keys to access different memory segments, and of the use of different keys, one allowing read access and another that grants both read and write access.

An article by Fouladgar and Afifi entitled "A Simple Privacy Protecting Scheme Enabling Delegation and Ownership Transfer for RFID Tags" discusses various privacy issues relating to the potential tracking of an RFID tag bearer and the possibility of an illegitimate reading device collecting information about him, and introduces a privacy protecting scheme based on pseudonyms that is intended to allow an online database to delegate temporarily and in a secure manner the capability to identify tags to selected readers, and to allow a reader which receives delegation for a given tag to identify this tag without referring to the on-line database. A protocol proposed therein also aims to allow transfer of tag ownership without threatening the new owner's privacy.

Referring now to prior patent documents, WO 2006/075146 relates to RFID tag security systems, and discusses how security and privacy of tag information in an RFID-based system can be achieved through the usage of pseudonyms generated based on one-way hash functions. A system based on binary one-way trees allows for the scalable generation and decoding of authentication keys to obtain access to tag identities.

The present inventors have realised, that despite the advantages offered by the arrangement described in the above mentioned article by Molnar, Soppera and Wagner, two drawbacks are that the tag has to incorporate a counter, which effectively means maintaining a state and allowing for denial-of-service attacks, and, due to a relative lack of precision, a new owner needs to be able to manipulate the counter, if the old owner still owns valid secrets. The present inventors have realised it would be desirable to provide a new RFID tag ownership scheme and RFID tag form to alleviate these disadvantages and to provide further benefits arising from such a scheme and tag. The present inventors have also realised it would be desirable to provide new RFID reader properties and authorisation processes and systems particularly suited to such a scheme and that allow further advantages to be derived.

In a first aspect the present invention provides an RFID device, comprising: a current read key for enabling the RFID device to be read by an RFID reader system holding the current read key; a current ownership key; means for receiving, from the RFID reader system, a change read key command and an indication that the RFID reader system holds the current ownership key; and means for replacing, responsive to receiving the change read key command and the indication that the RFID reader system holds the current ownership key, the current read key with a new current read key enabling the RFID device to be read by an RFID reader system holding the new current read key.

The RFID device may further comprise: means for generating random numbers; means for encrypting the random numbers with the relevant ownership and/or read key; means for sending the encrypted random number to the RFID reader system; means for receiving the random numbers in responses from the RFID reader system; and means for checking the received random numbers to authenticate that the RFID reader system holds the relevant ownership key and/or read key.

The RFID device may further comprise means for receiving a take ownership command from the RFID reader system.

The RFID device may further comprise: means for generating, responsive to receiving a take ownership command, a new ownership key; and means for sending the new ownership key to the RFID reader system.

The RFID device may further comprise: means for receiving acknowledgement of the RFID reader system receiving the new ownership key; and means for deleting, responsive to receiving the acknowledgement of the RFID reader system receiving the new ownership key, the current ownership key and treating the new ownership key as a new current ownership key.

The RFID device may further comprise one or more identification keys for use by an authorisation apparatus for identifying the RFID device.

The RFID device may further comprise a current authorisation key; means for receiving, from the RFID reader system, a take ownership command and an indication that the RFID reader system is authorised by an authorisation apparatus which holds the current authorisation key; and means for replacing, responsive to receiving the take ownership command and the indication that the RFID reader system is authorised by an authorisation apparatus which holds the current authorisation key, the current ownership key with a new current ownership key enabling the current read key of the RFID device to be replaced with a new current read key by an RFID reader system holding the new current ownership key. Where appropriate, the new ownership key may be encrypted using the current authorisation key.

In a further aspect, the present invention provides a method for an RFID device, the method comprising: storing a current read key for enabling the RFID device to be read by an RFID reader system holding the current read key; storing a current ownership key; receiving, from the RFID reader system, a change read key command and an indication that the RFID reader system holds the current ownership key; and in response to receiving the change read key command and the indication that the RFID reader system holds the current ownership key, replacing the current read key with a new current read key enabling the RFID device to be read by an RFID reader system holding the new current read key.

The method may further comprise: generating random numbers; encrypting the random numbers with the relevant ownership and/or read key; sending the encrypted random number to the RFID reader system; receiving the random numbers in responses from the RFID reader system; and checking the received random numbers to authenticate that the RFID reader system holds the relevant ownership key and/or read key.

The method may further comprise receiving a take ownership command from the RFID reader system.

The method may further comprise: generating a new ownership key in response to receiving a take ownership command; and sending the new ownership key to the RFID reader system.

The method may further comprise: receiving acknowledgement of the RFID reader system receiving the new ownership key; and in response to receiving the acknowledgement of the RFID reader system receiving the new ownership key, deleting the current ownership key and treating the new ownership key as a new current ownership key.

The method may further comprise sending the identity of the RFID device encrypted by one or more identification keys to the RFID reader system for use by an authorisation apparatus for identifying the RFID device.

The method may further comprise the RFID device successfully responding to being read by an RFID reader system holding the new current read key.

The method may further comprise: storing a current authorisation key; receiving, from the RFID reader system, a take ownership command and an indication that the RFID reader system is authorised by an authorisation apparatus which holds the current authorisation key; and in response to receiving the take ownership command and the indication that the RFID reader system is authorised by an authorisation apparatus which holds the current authorisation key, replacing the current ownership key with a new current ownership key enabling the current read key of the RFID device to be replaced with a new current read key by an RFID reader system holding the new current ownership key. Where appropriate, the new ownership key may be encrypted using a current authorisation key.

In a further aspect the present invention provides the following method, and an RFID device adapted to perform the following method: storing a current read key and a current ownership key; and receiving a take ownership command from an RFID reader system. The method may further comprise: sending a new ownership key to the RFID reader system and replacing the current ownership key with the new ownership key. The method may further comprise: replacing, responsive to a change read key command and an indication that the RFID reader system holds the new current ownership key, the current read key with a new current read key enabling reading of the RFID device by an RFID reader system holding the new current read key. The method may further comprise: generating and encrypting random numbers for authenticating that the RFID reader system holds the relevant ownership key and/or read key. The method may further comprise: the RFID device successfully responding to being read by an RFID reader system holding the new current read key.

In a further aspect the present invention provides an RFID system comprising: means for issuing a take ownership command to an RFID device; means for receiving a new ownership key from the RFID device, the new ownership key having been transmitted in an encrypted form; means for applying for authorisation of the new ownership key from authorisation apparatus of an authorisation entity, the authorisation signifying that the RFID reader system is permitted to take ownership of the RFID device; and means for receiving from the authorisation apparatus the new ownership key and an acknowledgement that may be communicated to the tag as evidence of authorisation.

The RFID reader system may further comprise means for using the new ownership key to authenticate, with the RFID device, a process of instructing the RFID device to change its current read key to a new read key for use by the RFID reader system when reading the RFID device. In such an RFID reader system, the means for using the new ownership key to authenticate the process of instructing may comprise means for performing a challenge and response involving a random number encrypted and decrypted using the new ownership key.

In a further aspect the present invention provides a method for an RFID reader system to process an RFID device, comprising: issuing a take ownership command to an RFID device; receiving a new ownership key from the RFID device, the new ownership key having been transmitted in an encrypted form; applying for authorisation of the new ownership key from authorisation apparatus of an authorisation entity, the authorisation signifying that the RFID reader system is permitted to take ownership of the RFID device; receiving from the authorisation apparatus the new ownership key and an acknowledgement that may be communicated to the tag as evidence of authorisation.

The method for an RFID reader system may further comprise using the new ownership key to authenticate, with the RFID device, a process of instructing the RFID device to change its current read key to a new read key for use by the RFID reader system when reading the RFID device. In such a method, using the new ownership key to authenticate the process of instructing may comprise performing a challenge and response involving a random number encrypted and decrypted using the new ownership key.

In the following section, the term "RFID tag", will generally be used, the word "tag" indicating that the RFID device may be suitable for "tagging" one or more items. It will be understood that "tags" may be any of a variety of sizes and shapes.

BRIEF DESCRIPTION OF THE DRAWINGS

Embodiments of the invention will now be described, by way of example only, with reference to the accompanying drawings, in which.

DETAILED DESCRIPTION OF PRESENT EXAMPLE EMBODIMENTS

An embodiment of an RFID tag adapted to perform different modes of operation such that effective "ownership" of the tag can be taken over by a new permitted party will now be described. Also an embodiment of a process for the RFID tag will be described. Also, a protocol employed by the adapted RFID tag will be described. Also, an adapted RFID reader and reading process and authorisation processes and systems that can be used in conjunction with the adapted RFID tag and protocol will be described.

Figure 1:
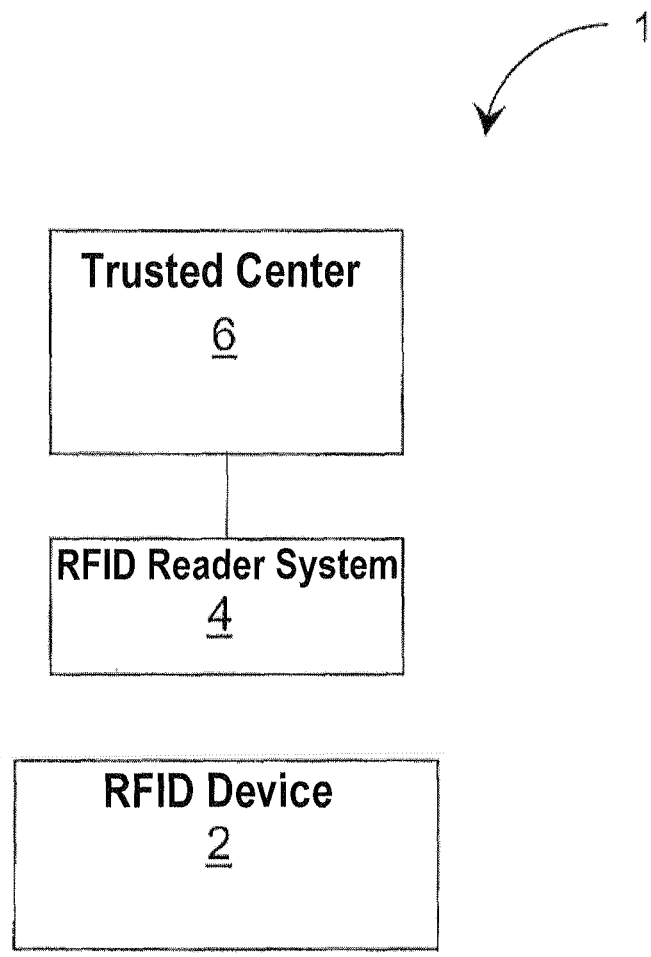
FIG. 1 shows a schematic overview of a system in which an embodiment of the invention may be implemented.

FIG. 1 shows a schematic overview of a system 1 in which the embodiment may be implemented. The system 1 comprises an RFID tag 2, hereafter referred to as the tag 2, an RFID reader system 4, and a trusted centre 6. The RFID reader system 4 is arranged to perform read-out of the tag 2. The trusted centre is coupled to the RFID reader system 4. The trusted centre 6, which may also be referred to as a trusted third party or a route authority, is an entity with responsibility for various authorisation, authentication and information supplying operations in relation to issued RFID tags including the tag 2. Thus the trusted centre 6 is one example of an authorising entity, comprising authorisation apparatus 6 that performs the process steps ascribed below to the trusted centre.

In this embodiment, the RFID reader system 4 comprises a conventional RFID reader coupled to a separate processing module for performing the processes described below. Furthermore, in this embodiment, the RFID reader and the separate processing module are collocated, i.e. both at the same premises of an entity requiring to process the received RFID tag 2. However, in other embodiments, the RFID reader system 4 may be implemented in other ways. One possibility is that a single integrated apparatus may be provided performing all the functionality of the RFID reader system 4. Another possibility is that the RFID reader system 4 may comprise a conventional RFID reader coupled to a plurality of separate processing modules for performing the processes described below. Another possibility is that the RFID reader system 4 may comprise a conventional RFID reader coupled to a plurality of separate processing modules for performing the processes described below, with one or more of the separate processing modules being provided as a distributed system, i.e. physically located remote from the RFID reader, e.g. at different premises to that where the RFID reader is located.

In this embodiment, except where stated otherwise below, the invitation tag operates according to the EPCGen2 standard. The EPCGen2 protocol (full name Class 1 Generation 2 UHF Air Interface Protocol Standard) is published by EPCglobal, and is incorporated herein by reference.

In relation to the RFID reader system 4, the tag 2 has two different behavioural modes, the data relevant to the behavioural mode relevant at a given time being the data which is output to the RFID reader system 4 by the tag 2 on being read. The two modes are:

1) An identification mode: for identification, the tag 2 behaves according to the standardized inventorying procedure (according to the relevant ISO 18000 substandard, e.g. ISO 18000-3 Mode 1/ISO 15693 or ISO 18000-6 Mode C/EPC Class 1 Gen 2), simply replacing the ID or EPC with a pseudonym of the same length. Every RFID reader system that has the current read key is able to identify the tag, but nothing else. Further details of this will be described later below with reference to FIG. 3.

2) An ownership mode: the RFID reader system can request a 'take-ownership' string from the tag, which includes:

identification information that is used by the trusted centre 6 to identify the tag 2.

an "ownership key" that can only be decrypted by the trusted centre 6.

Some encrypted acknowledgement information, e.g. a nonce.

If the RFID tag reader 4 is allowed to take ownership, it receives the ID or EPC, the "ownership key", and acknowledgement information from the trusted centre 6, as described in further detail later below with reference to FIG. 4. The ownership key can then be used to interact with the tag 2, changing a read key which the tag 2 uses to generate the pseudonym for identification, the protocol of which is described later below with reference to FIG. 5.

If the RFID reader system 4 confirms to the tag 2 that it has received the new ownership key, using the acknowledgement information, the old key is deleted. Hence, previous owners are not able to change the read key or indeed query the tag 2 anymore, since the read key has been changed by the new owner. This means that the read key can safely be passed on to every entity that is allowed to read the tag 2 for a certain amount of time. If the RFID reader system 4 is not allowed to take ownership, it can still be given the tag ID or EPC by the trusted centre 6.

To produce the identification information for the trusted centre 6, any suitable conventional protocol can be used. The choice may be made according to the load of the system and the demands on the trusted centre 6. For example: in small, closed systems, another pseudonym similar to the one used for identification, which is a random number encrypted with a unique symmetric key, can be used. However, in large systems with high load on the trusted centre 6, one preferred protocol is to use the tree based approach described in the article "Privacy and Security in Library RFID—Issues, Practices, and Architectures", David Molnar and David Wagner, Proceedings of the 11th ACM Conference on Computer and Communications Security, Oct. 25-29, 2004, Washington D.C., USA, which is incorporated herein by reference.

In such a tree scheme, each unique RFID tag has a pseudonym represented as a leaf in a tree. Instead of just transmitting the leaf pseudonym, the tag transmits a compound pseudonym that is used to identify a path from the root of the tree to the leaf (by including a pseudonym for each tree branching node in the compound pseudonym). When the Trusted Centre receives the compound pseudonym, it can use each component pseudonym to navigate the tree and identify the RFID tag. This solves the problem of not knowing which key to use to decode the pseudonym of an unknown tag. Instead of attempting to apply all known tag keys to decode the (leaf) pseudonym, the Trusted Centre can instead identify which child key is correct at each branching node in the tree. This results in identification of the tag in log(n) scale instead of n, where n is the number of known tags. The disadvantage of such a scheme is that m secrets must be used to generate the compound pseudonym, where m is the number of levels in the tree. This results in more key storage on the tag, more cryptographic operations on the tag and increased pseudonym communication size between the tag and the reader. Another possibility is to use a hash chain based approach described in the article "A scalable protocol for RFID pseudonyms", G. Avoine and P. Oechslin, IEEE PerSec, Orlando, USA, Mar. 14, 2004, which is incorporated herein by reference.

The following aspects are provided:

1) Two different modes of the tag 2 towards the RFID reader system 4, i.e. separation of the aspects of identification and interaction.

2) A possibility to take ownership of the tag 2 and prevent previous owners from changing the read key afterwards.

3) More precise means to delegate the ability for identification through the read key e.g. if a party, which received a read key, is no longer allowed to read the tag, the read key can be changed at any time by the owner.

This tends to provide the following advantages:

1) Identification can be fitted easily into existing standards, for example ISO standards.

2) There is no communication overhead for identification.

3) The approach is flexible in terms of the identification protocol used at the trusted centre 6.

In more detail, in this example the "Tree of Secrets" described in the above mentioned article by Molnar and Wagner, and incorporated herein by reference, is used as the identification protocol. This will be described in more detail later below with reference to FIG. 6.

In the following description the following notation will be used:

| | |
|---|---|
| $X \in \{0,1\}^n$ | Bitstring x of length n |
| c = a ∣ b | Concatenation of bitstring a of length n with bitstring b of length m, yielding a bitstring c with length n + m |
| $X_{trunc,m}$ | Bitstring x is truncated to a length of m bits. |
| $F_k(x): n \times n$ | Function to encrypt the bitstring x of length n with key k, obtaining another bitstring of the same length n. |
| len(x) | Length of bitstring x in bits. |

In the following description the following symbols will be used:

| | |
|---|---|
| r | Random number |
| $k_r$ | Read Key |
| $k_t$ | Ownership Key |
| $k_i$ | Key i from the Tree of Secrets |
| d | Depth of the Tree of Secrets |
| b | Branching factor of the Tree of Secrets |
| m | Length of a plaintext/ciphertext block |
| p | Pseudonym |
| $n_a$ | Nonce to acknowledge use of a new key $k_t$ or $k_r$. |

The Identification Protocol is the Tree of Secrets

Figure 6:
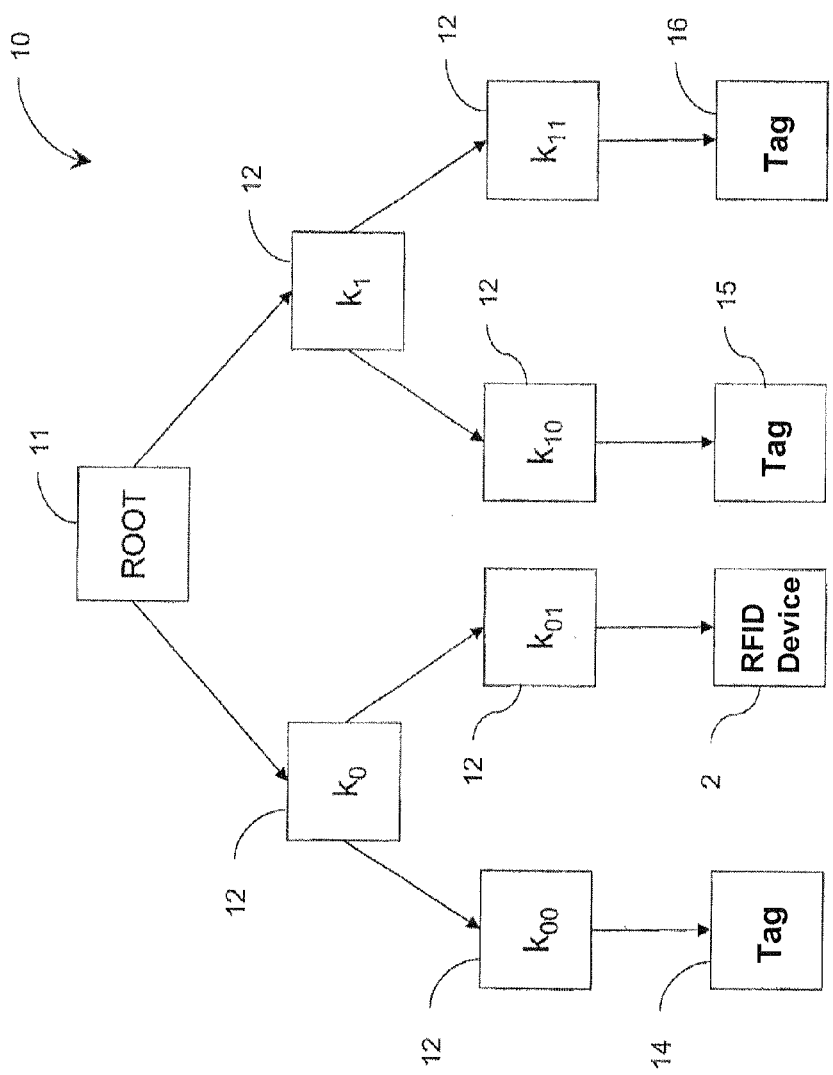
FIG. 6 shows a simplified example of a tree of secrets.

Trusted centre 6: The tree of secrets is organised as shown in FIG. 6.

Tag 2: The keys are stored in array keys of length d in the order they appear in the tree of secrets, going from the root to the leaf associated with a certain tag.

Figure 5:
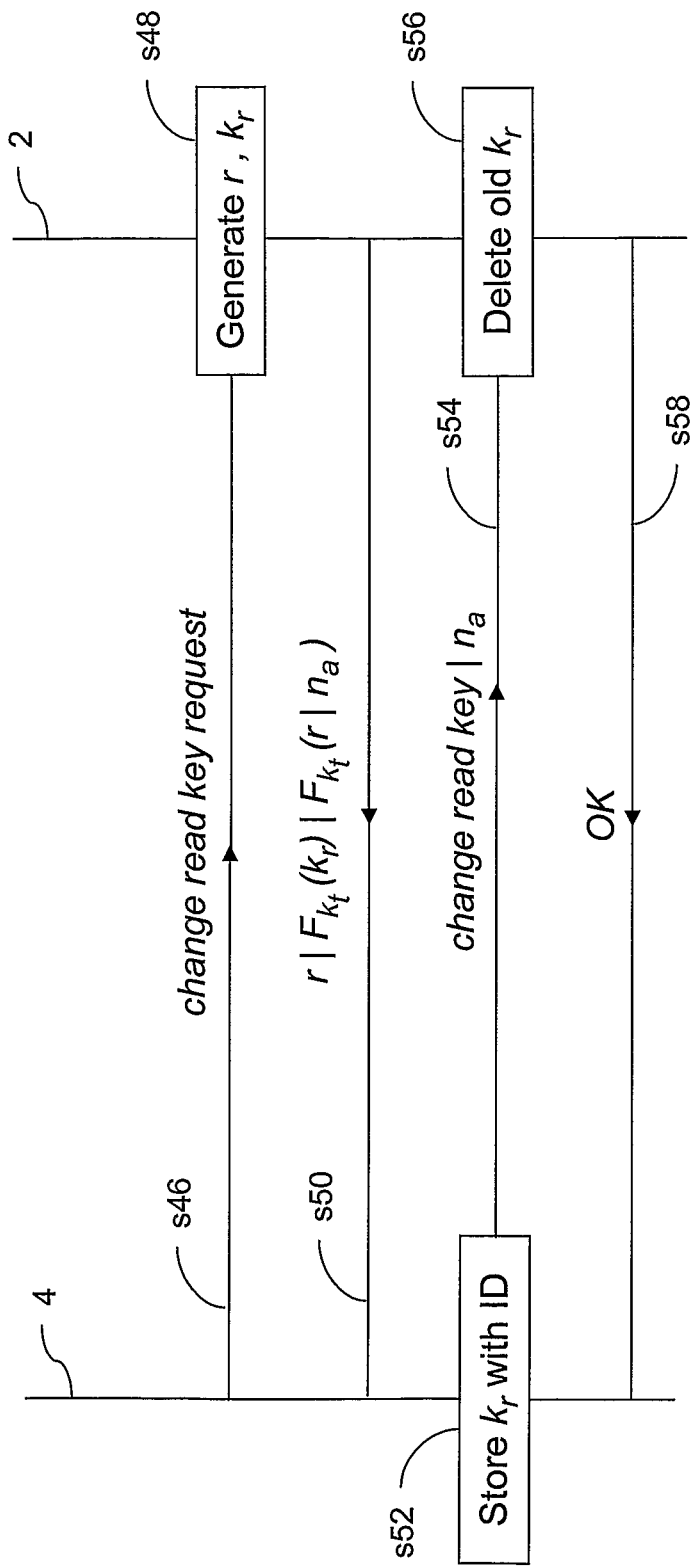
FIG. 5 is a combined message sequence chart and process flowchart showing certain messages sent, and certain process steps carried out, during one example of a process of changing a read key.

For example for tag 2 which is highlighted by way of example in FIG. 5:

d=2 keys[0]=$k_0$ on the tag=$k_0$ in the tree of secrets keys[1]=$k_1$ on the tag=$k_{01}$ in the tree of secrets The new operating protocol includes three different kinds of interaction, which may be termed:

i) Identification.

ii) Take Ownership.

iii) Change Read Key.

These will now be described in more detail.

i) Identification.

This corresponds to the standard compliant inventory procedure. The tag 2 uses a short random number r and a read key $k_r$, shared only between the tag 2 and the RFID reader system 4, to produce a pseudonym p with the same length as the ISO18000 tag identifier, for example the ISO18000 part 3 mode 1 ID or the ISO18000 part 6 mode C EPC. Encryption is performed using a standard cryptographic primitive, such as the Advanced Encryption Standard (AES) block cipher, AES is a Federal Information Processing Standards Publication (FIPS PUBS) issued by the National Institute of Standards and Technology (NIST) of the USA, and this standard is incorporated herein by reference.

Figure 3:
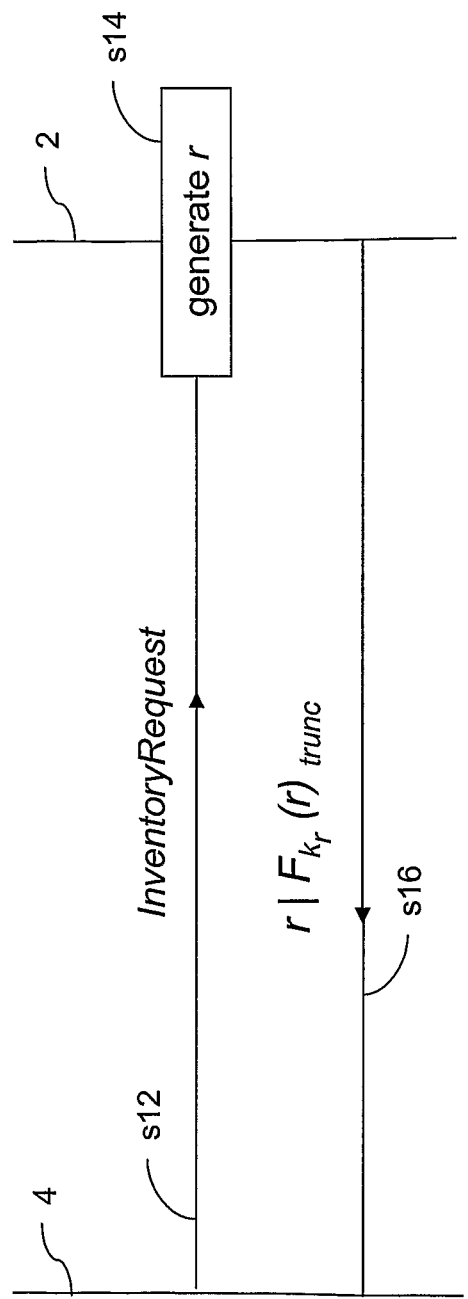
FIG. 3 is a combined message sequence chart and process flowchart showing certain messages sent, and certain process steps carried out, during one example of a process of implementation of a communication protocol for plain tag identification.

The pseudonym is generated by the tag 2 as follows:

n = len(tag identifier)
m = len(plaintext block)
Generate $r \in \{0,1\}^{n/2}$ and pad it with a known padding to obtain plaintext $\in \{0,1\}^m$
ciphertext $\in \{0,1\}^m = F_{k_r}$(plaintext)
p = r ∣ ciphertext$_{trunc,n/2}$ For example, a 64 bit pseudonym, encrypted with the 128 bit version of the AES cipher can be produced as follows (hexadecimal notation):

n = len(ID) = 64 bit
m = len(AES block) = 128 bit
Generate $r \in \{0,1\}^{32}$ and pad it with 96 zero bits to obtain plaintext $\in \{0,1\}^{128}$
ciphertext $\in \{0,1\}^{128}$ = AES$_{k_r}$(plaintext)
p = r ∣ ciphertext$_{trunk,32}$ p is then sent to the reader as response to the inventory request, as shown in FIG. 3 which will be described in more detail later below. The reader performs a linear search through its key space to find the key that yields ciphertexttrunk, n/2 upon encryption of r+padding:

```
for(index = 1; index <= number_of_stored_keys; index++)
    n = len(tag_ID)
    key = key_storage[index]
    c = encrypt using key(substring of p(0 to n/2) + padding)
    if(substring of c(0 to n/2) == substring of p(n/2 to n)
        ID = ID_storage[key]
        return key and ID
```

Since every key is unique, keys are used to identify the tag 2 by storing the ID together with the key. The number of tags in the local environment, for which read keys are available, should be reasonably small, so a linear search should be feasible. Another possibility is that in other embodiments it can be further reduced through delegating read keys, as described below.

ii) Take Ownership.

On first contact with a certain tag, e.g. tag 2, the RFID reader system 4 will not be able to decode the pseudonym sent out by the tag 2 and therefore the RFID reader system 4 will also be unable to identify the tag. This is because the tag has not been in the same domain of ownership and the read key is unknown. To change the domain of ownership, the RFID reader system queries the tag with a special command, called "Take Ownership" Command. This command may also be issued at any time later, even if the tag already is in the right domain of ownership. In this embodiment the Take Ownership command is implemented using the custom command space provided in ISO18000 series standards.

The response is a bitstring based on the static tree of secrets described above. It is extended by the following two pieces of information:

1. A new secret denoted ownership key $k_t$ that is generated randomly by the tag 2.

2. A nonce $n_a$ that will be used later in the procedure to acknowledge the reception of the new key to the tag 2.

The response is generated by the tag 2 using the following procedure:

```
d = depth of the tree of secrets = number of keys stored on the tag
m = len(plaintext block)
Generate r ∈ {0,1}^m, k_t ∈ {0,1}^m, n_a ∈ {0,1}^m
for(i = 1; i <= d; i++)
    k_i = keys[i]
    ciphertext_id |= F_ki(r) // concatenate encryption result for each key
ciphertext_kt = F_ki(k_t)
ciphertext_na = F_ki(n_a)
response = r | ciphertext_id | ciphertext_kt | ciphertext_na
```

$r$, $k_t$ and $n_a$ are all generated uniformly by the tag 2, using a random number generator. The for-loop corresponds to the static tree of secrets of the above described tree of secrets scheme and serves for identification only, which is indicated by the subscript for the resulting ciphertext. Any key $k_i$ out of the tree of secrets can be used to encrypt $k_t$ and $n_a$, as long as they are made inaccessible for the reader.

Figure 4:
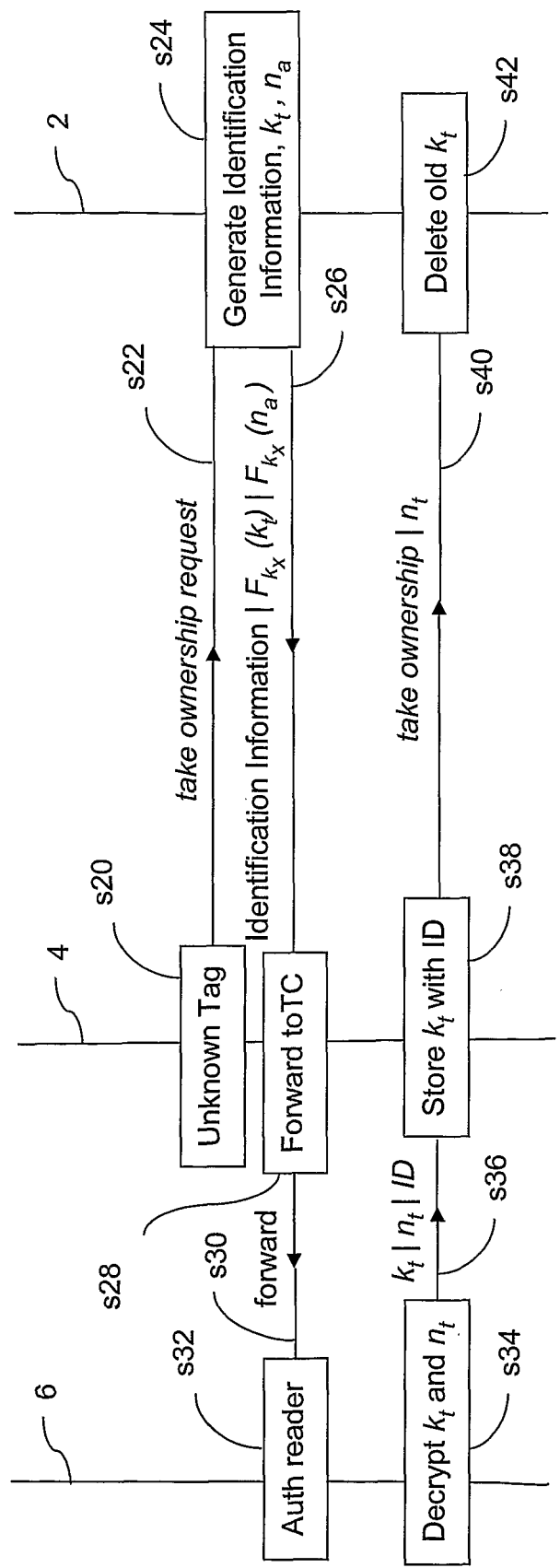
FIG. 4 is a combined message sequence chart and process flowchart showing certain messages sent, and certain process steps carried out, during one example of a process of implementation of a communication protocol for Take Ownership.

As shown in FIG. 4, where "Identification Information" corresponds to the tree of secrets in this case, the response comprises the following information:

1) The random number r.

2) The concatenated results of encrypting this random number with every key from the tree of secrets subsequently, $F_{k1}(r)|F_{k2}(r)|\ldots|F_{kd}(r)$ 3) The encrypted ownership key $k_t$, $F_{ki}(k_t)$ 4) The encrypted acknowledgement nonce $n_a$, $F_{ki}(n_a)$ Hence, the length of the response is $len(r)+len(d*m)+len(m)+len(m)$.

This response is passed directly to the trusted centre 6, since it is not of any use to the RFID reader system 4. The trusted centre 6 identifies the tag 2 by performing, in this example, a depth first search (in this example, the algorithm shown immediately below in Java-like syntax, ciph_id corresponding to ciphertextid):

```
Node.searchKey(String r, String[ ] ciph_id, int layer, int d)
{
    int m = ciphertext_block_length;
    Node[ ] children = this.getChildren( );
    for(Node child : children) // for each child node
    {
        current_key = child.getKey( );
        ciphertext = encrypt using current_key(r);
        if(ciphertext == ciph_id[layer])
        {
            if(layer == d)
            {
                return this.getID( );
            }
            else
            {
                ID = child.searchKey(r, ciph_id, layer+1, d);
                return ID;
            }
        }
    }
}
```

After identification, the trusted centre 6 looks up the security and privacy policy of this tag. According to policy of this example, three choices exist:

1) The RFID reader system 4 is not included in the list of readers allowed to read this tag 2, the request is rejected.

2) The RFID reader system 4 is allowed to read this tag 2 only, the trusted centre 6 returns the tag identifier only.

3) The RFID reader system 4 is allowed to take ownership of the tag 2. In this case, the trusted centre 6 uses $k_i$, that was specified during system setup, to decrypt $k_t$ and $n_a$. Afterwards, it returns the tag identifier, the ownership key $k_t$ and the acknowledgement nonce $n_a$ to the RFID reader system 4.

After reception of the new secret, the RFID reader system 4 sends $n_a$ back to the tag 2 to acknowledge. The tag 2 deletes the old key $k_r$, if any, and acknowledges itself by returning an ISO18000 compliant "OK".

The RFID reader system 4 is still not able to perform normal tag authentication as it has not yet changed the read key. Hence the RFID reader system 4 thereafter issues a change read key command, which is described in more detail in part iii) below.

In further embodiments, the length of the tag response may be reduced, with resultant reduction in the time taken to transmit the tag response. There are various ways this can be done, for example:

1) Use of a short random number—the random number does not have to be the same length as a plaintext block, but can be much shorter, since it is used only once for identification. The length can be chosen depending on the quality of the random number generator and the number of tags in the whole system. The remaining number of bits up to the length of the plaintext block is then padded with a known padding for encryption, such as described in part i). This would reduce the overall length to $len(r')+(d*m)+m+m$, where r' is a random number of $len(r')<m$.

2) Use of truncation—as described in the above mentioned article by Molnar, Soppera and Wagner, depending on the branching factor of the tree, it is possible to truncate a large amount of each of the encryption results for the tree of secrets. This is possible, because the right key is searched through encrypting the known plaintext and comparing the result instead of trying to decrypt the ciphertext. For example in a binary tree, the ciphertext may be truncated down to 1 bit for each layer, without leading to many false positives, assuming a uniform distribution of key values within the tree. However, the encryption result for the lowest layer of the tree should not be truncated to ensure a unique identification of the tag. Given a length n<m for a truncated ciphertext string, this reduces the overall length of the response so len(r)+(d−1*n)+m+m+m. However, truncation is not possible for $k_t$ and $n_a$, because the plaintext is unknown.

3) Use of short random number and short acknowledgement nonce—by also reducing the length of both, the random number r and the acknowledgement nonce $n_a$, they can be combined within the last stage of the tree of secrets if len(r')+len(na)<=m. The total length of the response would then be len(r')+(d*m)+m.

4) Use of a combination of points 1-3—using a short random number, including $n_a$ with the last stage of the tree of secrets, and truncating all other stages, the communication overhead can be greatly reduced to len(r')+(d−1*n)+m+m.

iii) Change Read Key.

This command may be issued by every party, entity or instance that "owns" the tag 2, that is, holds the ownership key. As a, response to this command, the tag 2 generates a new read key $k_r$ and an acknowledge nonce $n_a$ and protects them using the ownership key $k_t$.

> n = len(tag identifier)
> m = len(plaintext block)
> Generate r ∈ {0,1}$^m$, $k_r$ ∈ {0,1}$^m$, $n_a$ ∈ {0,1}$^m$
> ciphertext = $F_{kt}(r)$ | $F_{kt}(k_r)$ | $F_{kt}(n_a)$
> response = r | ciphertext The length of the response is len(r)+m+m.

In this communication, the random number serves only for prevention of replay attacks.

If an RFID reader system, for example RFID reader system 4 "owns" the tag, for example tag 2, the RFID reader system 4 is able to decode this information, store the read key and acknowledge its use. The read key can then be distributed by the owner to all readers that are supposed to be able to read, the tag 2.

In further embodiments, a short random number and short acknowledgement nonce may be used—as with the take ownership command, the communication overhead can be reduced by using a random number r' and an acknowledgement nonce $n_a$ such that len(r')+len($n_a$)<=m, yielding a response length of len(r')+m.

Figure 2:
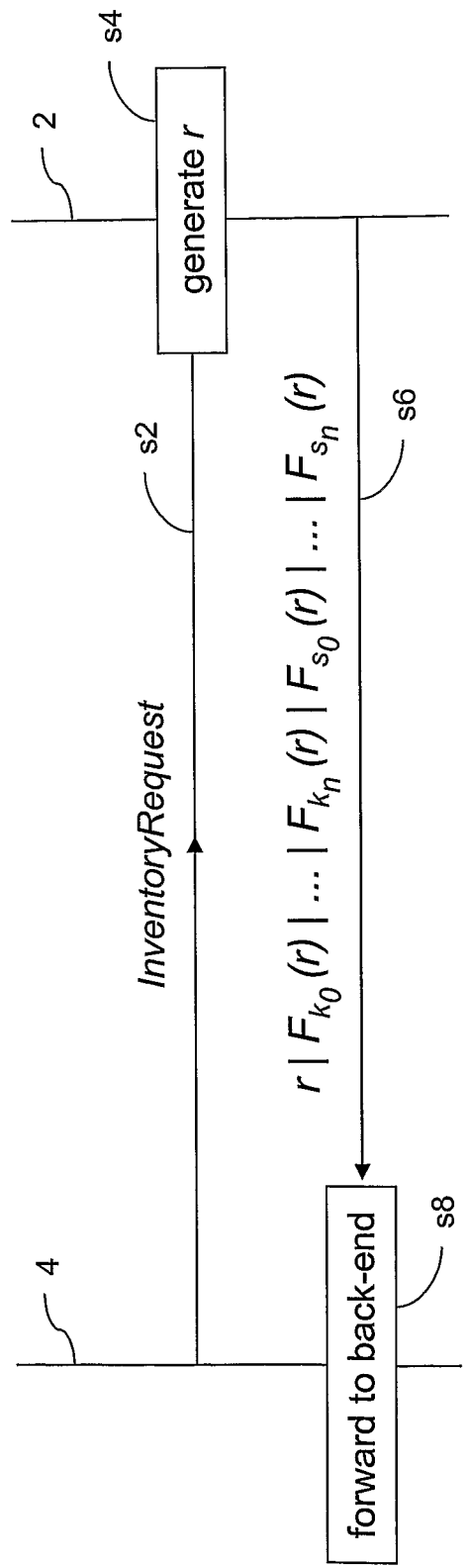
FIG. 2 is a combined message sequence chart and process flowchart showing certain messages sent, and certain process steps carried out, during one example of a process of implementation of a read command.

FIG. 2 is a combined message sequence chart and process flowchart showing certain messages sent between the RFID reader system 4 and the tag 2, and certain process steps carried out by these elements, during one example of a process of implementation of a read command that can be used with the above described embodiment. In this example, the process of implementation of the read command is according to the above mentioned article by Molnar and Wagner.

At step s2, the RFID reader system 4 sends an Inventory Request to the tag 2. At step s4, the tag 2 generates "r", a random nonce. At step s6, the tag 2 sends a concatenation function output to the RFID reader system 4. The concatenation function is:

$$r|F_{k0}(r)|\ldots|F_{kn}(r)|F_{s0}(r)|\ldots|F_{sn}(r)$$

At step s8, the RFID reader system 4 forwards the concatenation function output to its back-end.

FIG. 3 is a combined message sequence chart and process flowchart showing certain messages sent between the RFID reader system 4 and the tag 2, and certain process steps carried out by these elements, during one example of a process of implementation of a communication protocol for plain tag identification that can be used with the above described embodiment. This is in effect a read command, i.e. the RFID reader system 4 reading the tag 2 using the read key.

At step s12, the RFID reader system 4 sends an Inventory Request to the tag 2. At step s14, the tag 2 generates "r", a random nonce. At step s16, the tag 2 sends a concatenation function output to the RFID reader system 4. The concatenation function is:

$$r|F_{kr}(r)_{trunc}$$

In this concatenation function, the plain text r is concatenated with $F_{kr}$, $F_{kr}$ being the encryption function using the read key. Furthermore, the encryption function is truncated.

FIG. 3 shows the pseudonym generated by the tag is produced by encryption with the read key $k_r$ for local decryption by a reader back-end possessing $k_r$. In FIG. 2, the pseudonym is produced using the Molnar and Wagner scheme for decryption by the Trusted Centre 6 using a series of keys $k_i$ arranged in a hierarchy. This scheme is more scalable in terms of tag identification and hence more suited to the Trusted Centre 6 which will have knowledge of more keys that a single reader back-end system. In other examples the Trusted Centre 6 may also use a single Trusted Centre read key $k_{tc}$. In another example the read key $k_r$ used by the reader back-end may be implemented as a series of read keys $k_{ri}$ using the Molnar and Wagner scheme.

FIG. 4 is a combined message sequence chart and process flowchart showing certain messages sent between the trusted centre 6, the RFID reader system 4 and the tag 2, and certain process steps carried out by these elements, during one example of a process of implementation of a communication protocol for Take Ownership that can be used with the above described embodiment. In this example, the communication protocol for take Ownership is for where "Identification Information" denotes an arbitrary identification protocol, such as the tree-based protocol described in the above mentioned Molnar and Wagner article.

At step s20, the reader determines it is attempting to read an unknown tag. Therefore, at step s22, the RFID reader system 4 sends a take ownership request to the tag 2. At step s24, the tag 2 generates a challenge comprising the above mentioned Identification Information, an ownership key $k_t$, and a nonce $n_a$. At step s26, the tag 2 sends a concatenation function output to the RFID reader system 4. The concatenation function is:

$$\text{Identification Information}|F_{kx}(k_t)|F_{kx}(n_a)$$

At step s28, the RFID reader system 4 determines to forward this concatenation function output to the trusted centre 6. Consequently, at step s30, the RFID reader system 4 forwards this concatenation function output to the trusted centre 6. At step s32, the trusted centre 6 authenticates the RFID reader system 4. If authentication is successful, then at step s34, the trusted centre 6 decrypts the ownership key $k_t$ and the nonce, which may now conveniently be called $n_t$. Indeed, it will be appreciated that in the present description and figures, the term $n_a$ is synonymous with the term $n_r$ when the referred to nonce is generated for or used during changing of the ownership key, whereas the term $n_a$ is synonymous with the term $n_t$ when the referred to nonce is generated for or used during changing of the read key. At step s36, the trusted centre 6 sends a concatenation function output to the RFID reader system 4. The concatenation function is:

$k_t | n_r | ID$

At step s38, the RFID reader system 4 stores the decrypted ownership key $k_t$ with ID, where ID is an identifier that can be meaningfully associated with other tag or object information, such as an Electronic Product Code. At step s40, the RFID reader system 4 sends a concatenation function output to the tag 2. The concatenation function is:

take ownership$|n_r$

At step s40, the tag 2 deletes the old ownership key $k_r$. Hence, at the end of the process steps shown in FIG. 4, the ownership of the tag 2 has been taken such that the tag 2 can be controlled. The tag 2 is then controlled by changing the read key, as will be described in more detail with reference to FIG. 5 below. The tag 2 is then controlled by the new owner in the sense that other parties, including any previous owner, are excluded as they will not have the new read key for the tag 2.

FIG. 5 is a combined message sequence chart and process flowchart showing certain messages sent between the RFID reader system 4 and the tag 2, and certain process steps carried out by these elements, during one example of a process of changing the read key that can be used with the above described embodiment. $k_t$ denotes the ownership key, $k_r$ the new read key, and $n_a$ is a nonce for acknowledgement. At step s46, the RFID reader system 4 sends a change read key request to the tag 2. At step s48, the tag 2 generates "r", a random nonce, and the new read key $k_r$. At step s50, the tag 2 sends a concatenation function output to the RFID reader system 4. The concatenation function is:

$r | F_{kt}(k_r) | F_{kt}(r | n_a)$

At step s52, the RFID reader system 4 the decrypted ownership key $k_t$ with ID, where ID is an identifier that can be meaningfully associated with other tag or object information, such as an Electronic Product Code. At step s54, the RFID reader system 4 sends a concatenated function output to the tag 2. The concatenation function is:

change read key$|n_a$

In the concatenation function, "change read key" is a command. At step s56, the tag 2 deletes the old read key. At step s58, the tag 2 sends an OK confirmation to the RFID reader system 4.

FIG. 6 shows a simplified example of a tree of secrets used in this example. The tree of secrets 10 comprises a plurality of nodes, in particular a root 11 and a plurality of leaves 12. Each leaf 12 corresponds to a key. The leaves 12 are in hierarchical layers, e.g. in this example there is a first hierarchical layer with keys $k_0$ and $k_1$, and a second hierarchical layer with keys $k_{00}$, $k_{01}$, $k_{10}$ and $k_{11}$. Each leaf 12 in the second hierarchical layer, which in this simplified example is the final layer, is connected to a respective tag. In this example, the leaf with key $k_{00}$ is connected to tag 14, the leaf with key $k_{01}$ is connected to tag 2, the leaf with key $k_{10}$ is connected to tag 15, and the leaf with key $k_{11}$ is connected to tag 16. A given tag stores all the keys that are on its unique leaf path from the root 11 to the leaf that connects to that tag. For example, tag 2 stores keys $k_0$ and $k_{01}$.

Figure 7:
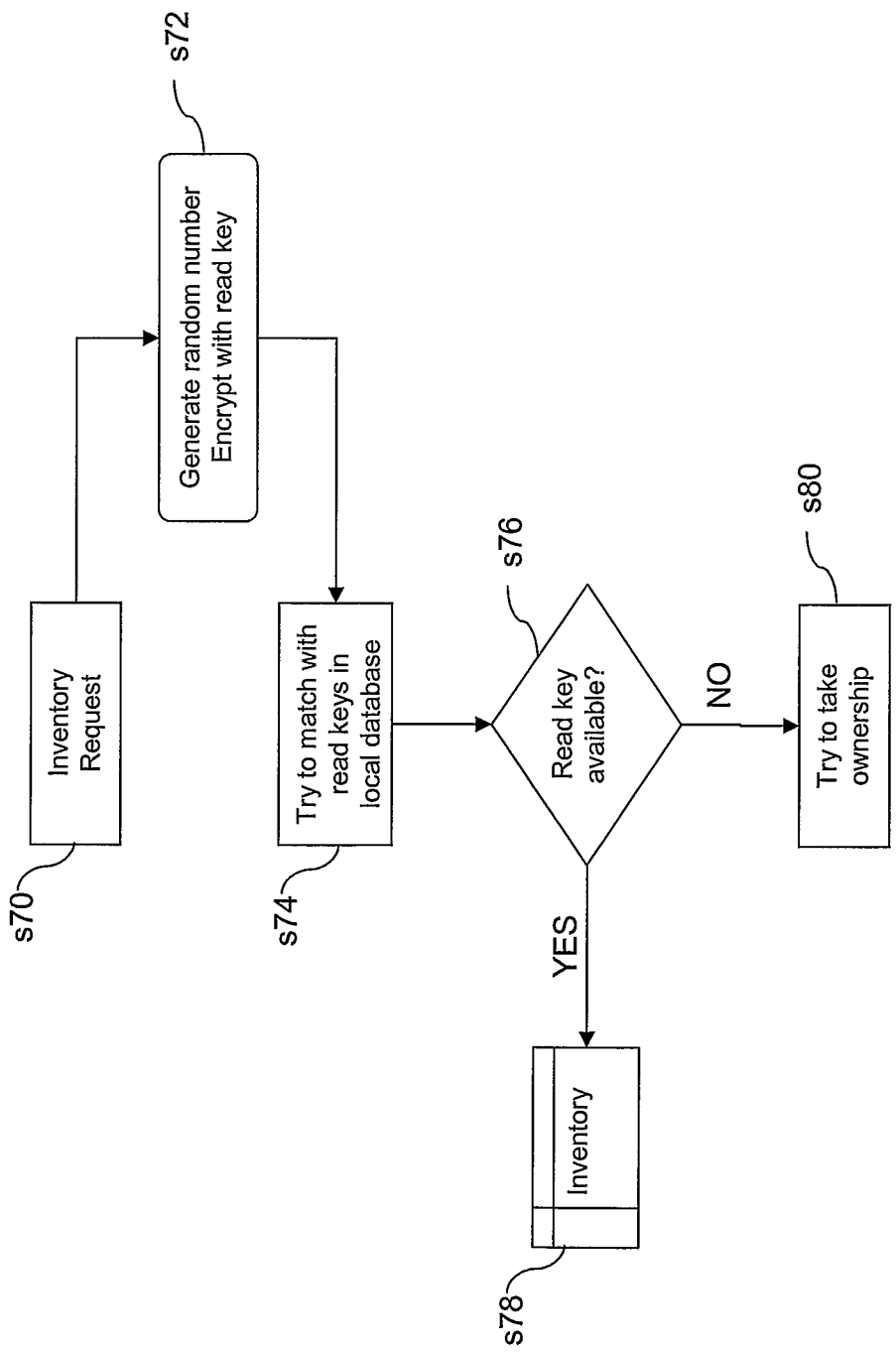
FIG. 7 is a process flowchart showing certain process steps carried out in one example of an inventorying process.

FIG. 7 is a process flowchart showing certain process steps carried out in one example of an inventorying process that can be used with the above described take ownership protocols.

At step s70, the RFID reader system 4 raises an inventory request and sends the inventory request to the tag 2. At step s72, the tag 2 generates a random number, encrypts the random number with a read key, and sends the encrypted number to the RFID reader system 4. At step s74, the RFID reader system 4 attempts to find a matching key in its local database. At step s76 the RFID reader system 4 determines whether such a read key is available. If the outcome of the determination at step s76 is positive, i.e. the read key is available, then the process moves to step s78, where the RFID reader system 4 decrypts the identifier and outputs the decrypted inventory information. However, if the outcome of the determination at step s76 is negative, i.e. the read key is not available, then the process moves to step s80, where the RFID reader system 14 attempts to take ownership of the tag 2.

Figure 8:
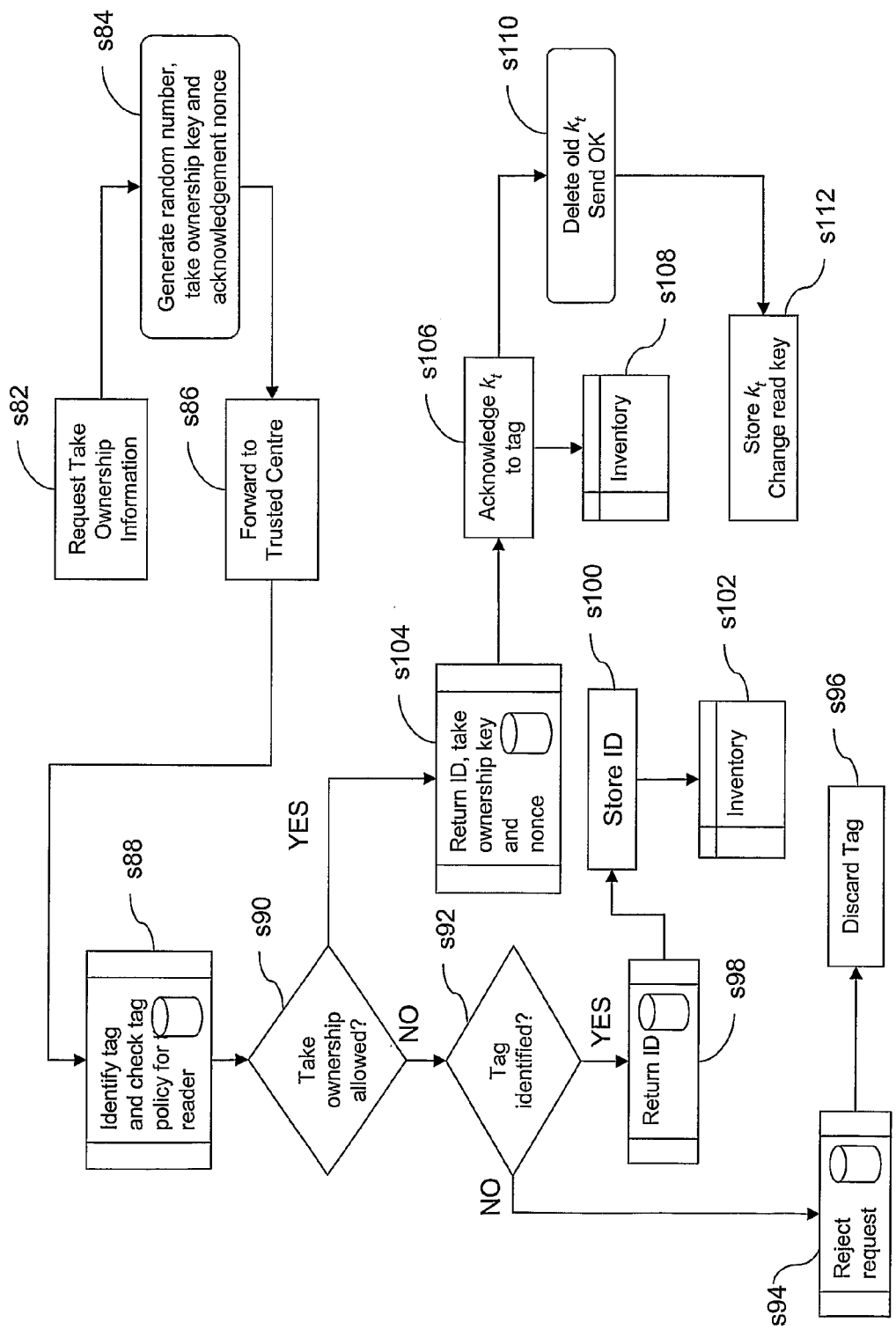
FIG. 8 is a process flowchart showing certain process steps carried out in one example of a take ownership process.

FIG. 8 is a process flowchart showing certain process steps carried out in one example of a take ownership process that can be used with the above described take ownership protocols and/or for implementing the attempting to take ownership step s80 of the process described with reference to FIG. 7. In the process of FIG. 8, the trusted centre 6 decides which information to send to the RFID reader system 4.

At step s82, the RFID reader system 4 requests take ownership information from the tag 2. At step s84, the tag 2 generates a random number, an ownership key, and an acknowledgement nonce, and sends these items to the RFID reader system 4. At step s86, the RFID reader system 4 forwards the random number, the ownership key, and the acknowledgement nonce to the trusted centre 6. At step s88, the trusted centre 6, identifies the tag 2 and checks a stored tag policy for the given RFID reader system 4. At step s90, the trusted centre determines whether "take ownership" is allowed. If the outcome of the determining step s90 is negative, i.e. "take ownership" is not allowed, then the process moves to step s92, where the trusted centre determines whether the tag has nevertheless been successfully identified. If the outcome of the determining step s92 is negative, i.e. if the tag 2 has not been identified, then the process moves to step s94, where the trusted centre 6 rejects the take ownership request, and informs the RFID reader system 4 of this outcome. Consequently, at step s96, the RFID reader system 4 effectively discards the tag 2. If, however, the outcome of the determining step s92 is positive, i.e. if the tag 2 has been identified, then the process moves to step s98, where the trusted centre 6 returns the identification (ID) to the RFID reader system 4. At step s100, the RFID reader system 4 stores the received identification (ID). At step s102, the RFID reader system 4 decrypts the identification and outputs the decrypted inventory information. Returning now to the determining step s90, if the outcome is positive, i.e. "take ownership" is allowed, then the process moves to step s104, where the trusted centre 6 returns the identification (ID), the ownership key, and the acknowledgement nonce to the RFID reader system 4. At step s106, the RFID reader system 4 acknowledges the ownership key by sending the acknowledgement nonce to the tag 2. Additionally, at step s108, the RFID reader system 4 decrypts the identification and outputs the decrypted inventory information. At step s110, the tag 2, in response to receiving the acknowledgement nonce from the RFID reader system 4, deletes the old ownership key, and sends an OK confirmation to the RFID reader system 4. After receiving the OK conformation, the RFID reader system 4 stores the new ownership key, and optionally changes the read key.

Figure 9:
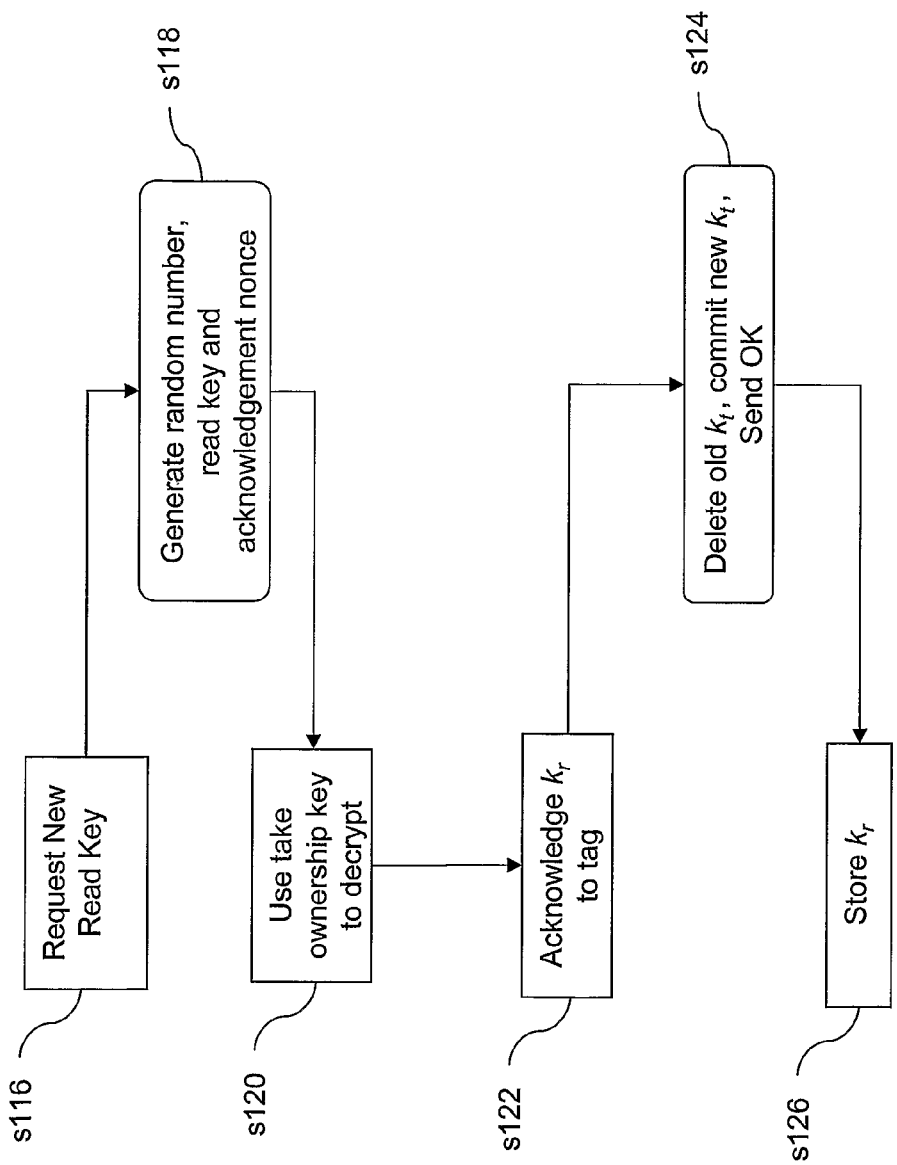
FIG. 9 is a process flowchart showing certain process steps carried out in one example of a change read key process.

FIG. 9 is a process flowchart showing certain process steps carried out in one example of a change read key process that can be used with the above described take ownership protocols and/or for implementing the optional change read key part of step s112 of the process described with reference to FIG. 8. In the process of FIG. 9, interaction between the tag 2 and the RFID reader system 4 is similar to that in the take ownership process of FIG. 8, however the trusted centre 6 is not involved this time. The RFID reader system 4 already has the ownership key, and in the process of FIG. 9 is instructing and enabling the tag 2 to generate a new read key.

At step s116, the RFID reader system 4 requests a new read key from the tag 2. At step s118, the tag 2 generates a random number, a read key and an acknowledgement nonce, and forwards these items to the RFID reader system 4. At step s120, the RFID reader system 4 uses the ownership key that it already holds to decrypt the received items. At step s122, the RFID reader system 4 acknowledges the read key to the tag 2, i.e. sends an acknowledgement of the read key to the tag 2. At step s124, the tag 2, in response to receiving the acknowledgement, deletes the old read key, commits to the new read key, i.e. makes the new read key the current read key, and, sends an OK confirmation to the RFID reader system 4. At step s126, the RFID reader system 4 stores the new read key.

In the above example, the read key $k_r$ is maintained separately from the keys in the tree of secrets $k_i$. $k_r$ is a unique secret for the tag used by the reader back-end, where the leaf key of the series of keys $k_i$ is used by the trusted centre to uniquely identify the tag. This allows the read key $k_r$ to be changed locally by the tag owner without having to inform the trusted centre, which can still identify the tag using the keys $k_i$.

In the above example, the leaf key (or plural keys) of the series of keys $k_i$ serves as an (or plural) identification keys stored by the RFID tag for use by the trusted centre for identifying the RFID tag. In other examples where other protocols are used, other keys may be used as the one or more identification keys for use by the trusted centre for identifying the RFID tag. In other examples, identification may be verified by other means.

It will be appreciated that a layering of capabilities is provided. A first layer or level is reading of the tag by a reader possessing $k_r$; a second layer or level is changing the read key of the tag by a reader possessing $k_r$ (the owner); and a third layer or level is the application to the trusted centre to apply for ownership of the tag. It should be noted that one or more of the process steps and messages depicted in the Figures and described above may be replaced by other steps achieving the same purpose(s), or where possible such process steps and messages may be performed in differing order to that presented above and shown in the Figures. Furthermore, although all the process steps and messages have, for convenience and ease of understanding, been depicted as discrete temporally-sequential steps, nevertheless some of the process steps and messages may in fact be performed simultaneously or at least overlapping to some extent temporally.

Finally, while embodiments of the invention have been described in relation to radio frequency devices, it will be understood that some of the concepts described may also be applicable to other types of identification devices other than those which make use of radio frequency communication channels.

What is claimed is:

1. An RFID device, comprising:
   a current read key for encrypting device data on the RFID device such that it is readable by an RFID reader system also holding the current read key;
   a current ownership key; and
   a receiver configured to receive, from the RFID reader system, a change read key command, a take ownership command and an indication that the RFID reader system holds the current ownership key; wherein the take ownership command is indicative of a request for generation of a new ownership key; and
   the RFID device is configured to replace, responsive to receiving the change read key command and the indication that the RFID reader system holds the current ownership key, the current read key held on the RFID device with a new current read key, the new current read key being for encrypting the device data on the RFID device such that said device data is readable by the RFID reader system or another RFID reader system also holding the new current read key.

2. An RFID device according to claim 1, wherein the RFID device is further configured to:
   generate random numbers;
   encrypt the random numbers with the relevant ownership and/or read key;
   send the encrypted random number to the RFID reader system;
   receive the random numbers in responses from the RFID reader system; and
   check the received random numbers to authenticate that the RFID reader system holds the relevant ownership key and/or read key.

3. An RFID device according to claim 1, wherein the RFID device is further configured to:
   generate, responsive to receiving the take ownership command, the new ownership key; and
   send the new ownership key to the RFID reader system.

4. An RFID device according to claim 3, further comprising:
   a current authorisation key;
   a receiver configured to receive, from the RFID reader system, the take ownership command and an indication that the RFID reader system is authorised by an authorisation apparatus which holds the current authorisation key;
   wherein the RFID device is further configured to replace, responsive to receiving the take ownership command and the indication that the RFID reader system is authorised by an authorisation apparatus which holds the current authorisation key, the current ownership key with a new current ownership key so that the current read key of the RFID device is replaceable with a new current read key by the RFID reader system or another RFID reader system holding the new current ownership key.

5. An RFID device according to claim 4, wherein the new ownership key is encrypted using a current authorisation key.

6. An RFID device, comprising:
   a current read key for encrypting device data on the RFID device such that it is readable by an RFID reader system also holding the current read key;
   a current ownership key; and
   a receiver configured to receive, from the RFID reader system, a change read key command and an indication that the RFID reader system holds the current ownership key;
   wherein the RFID device is configured to:
   replace, responsive to receiving the change read key command and the indication that the RFID reader system holds the current ownership key, the current read key held on the RFID device with a new current read key, the new current read key being for encrypting the device data on the RFID device such that said device data is readable by the RFID reader system or another RFID reader system also holding the new current read key;

receive acknowledgement of the RFID reader system receiving a new ownership key; and delete, responsive to receiving the acknowledgement of the RFID reader system receiving the new ownership key, the current ownership key and treat the new ownership key as a new current ownership key.

7. An RFID device, comprising:

a current read key for encrypting device data on the RFID device such that it is readable by an RFID reader system also holding the current read key;

a current ownership key; and a receiver configured to receive, from the RFID reader system, a change read key command and an indication that the RFID reader system holds the current ownership key; wherein:

the RFID device is configured to replace, responsive to receiving the change read key command and the indication that the RFID reader system holds the current ownership key, the current read key held on the RFID device with a new current read key, the new current read key being for encrypting the device data on the RFID device such that said device data is readable by the RFID reader system or another MID reader system also holding the new current read key; and the RFID further comprises one or more identification keys for use by an authorisation apparatus for identifying the RFID device.

8. A method for an RFID device, the method comprising:

storing a current read key for encrypting device data on the RFID device such that said device data is readable by an RFID reader system also holding the current read key;

storing a current ownership key;

receiving, from the RFID reader system, a change read key command, a take ownership command and an indication that the RFID reader system holds the current ownership key; the take ownership command being indicative of a request for generation of a new ownership key and in response to receiving the change read key command and the indication that the RFID reader system holds the current ownership key, replacing the current read key held on the RFID device with a new current read key, the new current read key being for encrypting the device data on the RFID device such that it is readable by the RFID reader system or another RFID reader system also holding the new current read key.

9. A method according to claim 8, further comprising:

generating random numbers;

encrypting the random numbers with the relevant ownership and/or read key;

sending the encrypted random number to the RFID reader system;

receiving the random numbers in responses from the RFID reader system; and checking the received random numbers to authenticate that the RFID reader system holds the relevant ownership key and/or read key.

10. A method according to claim 8, further comprising:

generating the new ownership key in response to receiving the take ownership command; and sending the new ownership key to the RFID reader system.

11. A method according to claim 10, further comprising:

storing a current authorisation key;

receiving, from the RFID reader system, the take ownership command and an indication that the RFID reader system is authorised by an authorisation apparatus which holds the current authorisation key; and in response to receiving the take ownership command and the indication that the RFID reader system is authorised by an authorisation apparatus which holds the current authorisation key, replacing the current ownership key with a new current ownership key so that the current read key of the RFID device is replaceable with a new current read key by the RFID reader system or another RFID reader system holding the new current ownership key.

12. A method according to claim 11, wherein the new ownership key is encrypted using a current authorisation key.

13. A method for an RFID device, the method comprising:

storing a current read key for encrypting device data on the RFID device such that said device data is readable by an RFID reader system also holding the current read key;

storing a current ownership key;

receiving, from the RFID reader system, a change read key command and an indication that the RFID reader system holds the current ownership key;

in response to receiving the change read key command and the indication that the RFID reader system holds the current ownership key, replacing the current read key held on the RFID device with a new current read key, the new current read key being for encrypting the device data on the RFID device such that it is readable by the RFID reader system or another RFID reader system also holding the new current read key;

receiving acknowledgement of the RFID reader system receiving a new ownership key; and in response to receiving the acknowledgement of the RFID reader system receiving the new ownership key, deleting the current ownership key and treating the new ownership key as a new current ownership key.

14. A method for an RFID device, the method comprising:

storing a current read key for encrypting device data on the RFID device such that said device data is readable by an RFID reader system also holding the current read key;

storing a current ownership key;

receiving, from the RFID reader system, a change read key command and an indication that the RFID reader system holds the current ownership key;

in response to receiving the change read key command and the indication that the RFID reader system holds the current ownership key, replacing the current read key held on the RFID device with a new current read key, the new current read key being for encrypting the device data on the RFID device such that it is readable by the RFID reader system or another RFID reader system also holding the new current read key; and sending the identity of the RFID device encrypted by one or more identification keys to the RFID reader system for use by an authorisation apparatus for identifying the RFID device.

15. An RFID reader system, comprising:

a computer processing system, including a computer processor, the computer processing system being configured to:

issue a take ownership command to an RFID device, the take ownership command being indicative of a request for generation of a new ownership key;

receive the new ownership key from the RFID device, the new ownership key having been transmitted in an encrypted form;

apply for authorisation of the new ownership key from authorisation apparatus of an authorisation entity, the authorisation signifying that the RFID reader system is permitted to take ownership of the RFID device; and receive from the authorisation apparatus the new ownership key and an acknowledgement that is communicable to the tag as evidence of authorisation.

16. The RFID reader system according to claim 15, wherein the computer processing system is further configured to use the new ownership key to authenticate, with the RFID device, a process of instructing the RFID device to change its current read key to a new read key for use by the RFID reader system when reading the RFID device.

17. The RFID reader system according to claim 16, wherein the computer processing system is further configured to use the new ownership key to authenticate the process of instructing by at least performing a challenge and response involving a random number encrypted and decrypted using the new ownership key.

18. A method for an RFID reader system to process an RFID device, comprising:
  issuing a take ownership command to an RFID device the take ownership and being indicative of a request for generation of a new ownership key;
  receiving the new ownership key from the RFID device, the new ownership key having been transmitted in an encrypted form;
  applying for authorisation of the new ownership key from authorisation apparatus of an authorisation entity, the authorisation signifying that the RFID reader system is permitted to take ownership of the RFID device; and
  receiving from the authorisation apparatus the new ownership key and an acknowledgement that is communicable to the tag as evidence of authorisation.

19. A method according to claim 18, further comprising using the new ownership key to authenticate, with the RFID device, a process of instructing the RFID device to change its current read key to a new read key for use by the RFID reader system when reading the RFID device.

20. A method according to claim 19, wherein using the new ownership key to authenticate the process of instructing comprises performing a challenge and response involving a random number encrypted and decrypted using the new ownership key.

21. An RFID reader system, comprising:
  a processing system, including at least one computer processor, the processing system being configured to:
    issue a take ownership command to an RFID device, the take ownership command being indicative of a request for generation of a new ownership key;
    receive the new ownership key from the RFID device, the new ownership key having been transmitted in an encrypted form;
    apply for authorisation of the new ownership key from authorisation apparatus of an authorisation entity, the authorisation signifying that the RFID reader system is permitted to take ownership of the RFID device; and
    receive from the authorisation apparatus the new ownership key and an acknowledgement that is communicable to the tag as evidence of authorisation.

22. The RFID reader system according to claim 21, the processing system being further configured to use the new ownership key to authenticate, with the RFID device, a process of instructing the RFID device to change its current read key to a new read key for use by the RFID reader system when reading the RFID device.

23. The RFID reader system according to claim 22, the processing system being further configured to perform a challenge and response involving a random number encrypted and decrypted using the new ownership key.

24. An RFID device comprising:
  a memory configured to store a current read key so that the RFID device is readable by an RFID reader system holding the current read key;
  a memory configured to store a current ownership key;
  a receiver configured to receive, from the RFID reader system, a change read key command and an indication that the RFID reader system holds the current ownership key;
  a processing system, including a computer processor, configured to replace, responsive to receiving the change read key command and the indication that the RFID reader system holds the current ownership key, the current read key with a new current read key so that the RFID device is readable by the RFID reader system or another RFID reader system holding the new current read key; and
  a receiver configured to receive a take ownership command from the RFID reader system, the take ownership command being indicative of a request for generation of a new ownership key.

25. An RFID device according to claim 24, further comprising:
  a generator configured to generate, responsive to receiving a take ownership command, the new ownership key; and
  a sender configured to send the new ownership key to the RFID reader system.

26. A method for an RFID device, the method comprising:
  storing a current read key so that the RFID device is readable by an RFID reader system holding the current read key;
  storing a current ownership key;
  receiving, from the RFID reader system, a change read key command and an indication that the RFID reader system holds the current ownership key;
  in response to receiving the change read key command and the indication that the RFID reader system holds the current ownership key, replacing the current read key with a new current read key so that the RFID device is readable by the RFID reader system or another RFID reader system holding the new current read key; and
  receiving a take ownership command from the RFID reader system, the take ownership command being indicative of a request for generation of a new ownership key.

27. A method according to claim 26, further comprising:
  generating the new ownership key in response to receiving a take ownership command; and
  sending the new ownership key to the RFID reader system.

28. An RFID device, comprising:
  storage memory configured to store a current read key for encrypting device data on the RFID device such that it is readable by an RFID reader system also holding the current read key;
  storage memory configured to store a current ownership key;
  a receiver configured to receive, from the RFID reader system, a change read key command, a take ownership command and an indication that the RFID reader system holds the current ownership key, the take ownership command being indicative of a request for generation of a new ownership key; and
  a processing system including a computer processor configured to replace, responsive to receiving the change read key command and the indication that the RFID reader system holds the current ownership key, the current read key held on the RFID device with a new current read key, the new current read key being for encrypting the device data on the RFID device such that it is readable by the RFID reader system or another RFID reader system also holding the new current read key.

29. An RFID device according to claim 28, wherein the processing system is further configured to:
generate random numbers;
encrypt the random numbers with the relevant ownership and/or read key;
send the encrypted random number to the RFID reader system;
receive the random numbers in responses from the RFID reader system; and
check the received random numbers to authenticate that the RFID reader system holds the relevant ownership key and/or read key.

30. An RFID device according to claim 28, wherein the processing system is further configured to:
receive acknowledgement of the RFID reader system receiving the new ownership key; and
delete, responsive to receiving the acknowledgement of the RFID reader system receiving the new ownership key, the current ownership key and treat the new ownership key as a new current ownership key.

31. An RFID device according to claim 28, further comprising one or more identification keys for use by an authorization apparatus for identifying the RFID device.

* * * * *